Oct. 27, 1953  C. E. TACK  2,656,900
ROTOR BRAKE

Filed May 28, 1949  3 Sheets-Sheet 1

INVENTOR.
Carl E. Tack
BY
[signature]
Atty

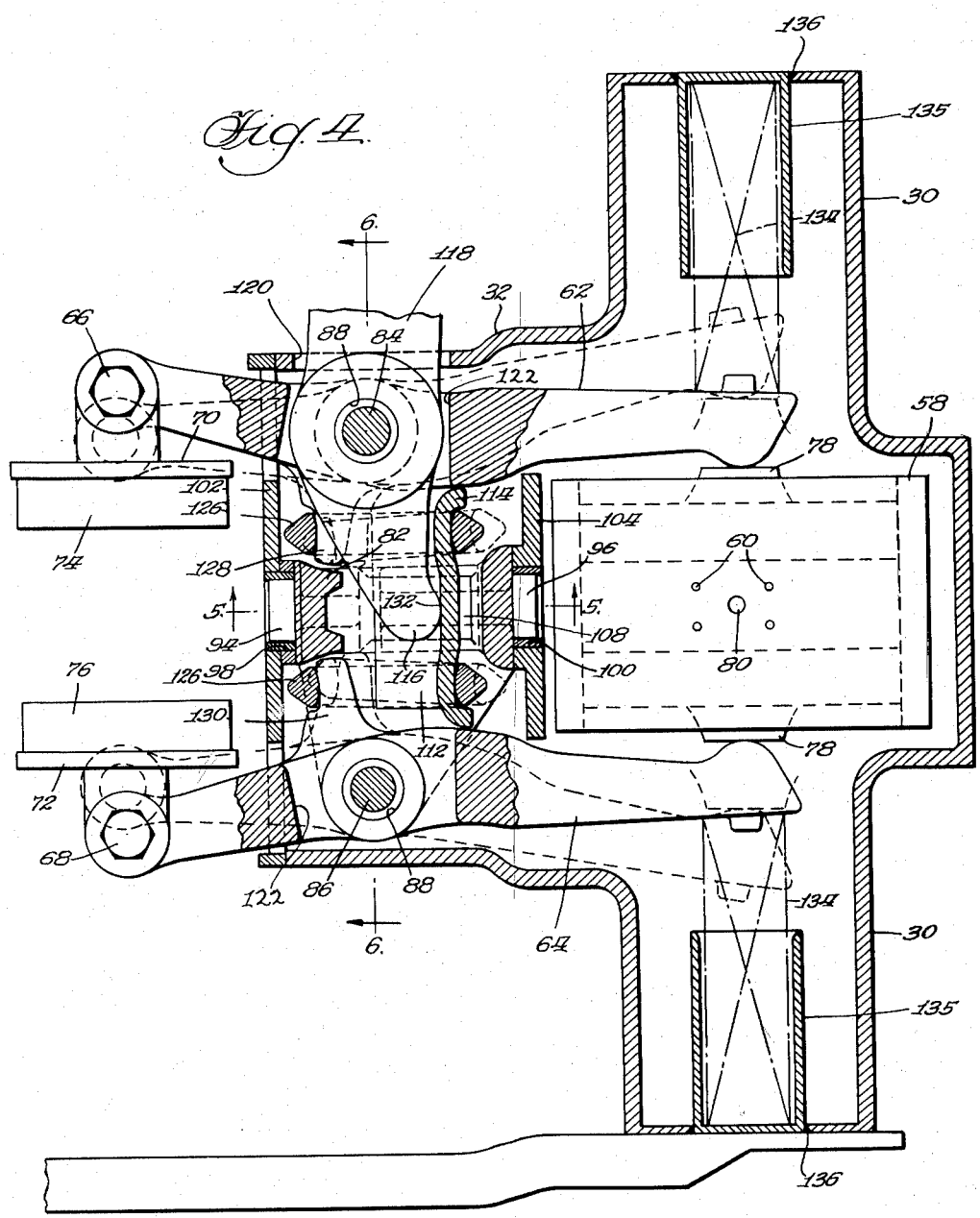

INVENTOR.
Carl E. Tack

Patented Oct. 27, 1953

2,656,900

UNITED STATES PATENT OFFICE 2,656,900
ROTOR BRAKE

Carl E. Tack, Chicago, Ill., assignor to American Steel Foundries, Chicago, Ill., a corporation of New Jersey Application May 28, 1949, Serial No. 95,961

12 Claims. (Cl. 188—107)

This invention relates to brakes and more particularly to a novel mechanical linkage adapted to connect brake shoe actuating levers of a railway disc brake to associated hand brake means.

A general object of the invention is to devise a novel compact hand brake arrangement which may be readily assembled and disassembled, and of rugged design capable of withstanding the severe vibrations and shocks of railway service.

A more specific object of the invention is to provide a maximum area within the necessary space limitations of a railway car truck for the brake cylinder and piston device which is attached to the inner extremities of the brake shoe actuating levers. This object of the invention is accomplished by connecting the hand brake means to the brake shoe actuating levers forwardly or outwardly of their pivotal fulcrums on the brake support structure of the truck.

A further object of the invention is to devise a compact and rugged hand brake in which the hand brake actuating lever is fulcrumed on a common fulcrum with one of the brake shoe actuating levers and is housed within and guidably engaged with an equalizer and one of a pair of links operably connecting the equalizer to hand brake actuating arms of the brake shoe operating levers.

Still another object of the invention is to devise a novel disc brake arrangement for a railway car truck wherein the inboard and outboard ends of a cylinder housing are provided with hollow extensions or lugs which afford a dual purpose of connecting the housing to the truck frame and of encasing release springs operably associated with the inner extremities of the brake shoe actuating levers, thereby accommodating release springs of maximum length and so arranged as to act upon the maximum lever arms of the brake shoe operating levers.

The foregoing and other objects and advantages of the invention will become apparent from a consideration of the following specification and accompanying drawings wherein Figure 1 is a fragmentary plan view showing approximately one-quarter of a railway car truck having the novel disc brake mechanism applied thereto;

Figure 4 is an enlarged top plan view, partly in central horizontal section of the disc brake mechanism removed from the truck;

In each of said figures, certain details may be eliminated where more clearly seen in other views.

Figure 1:
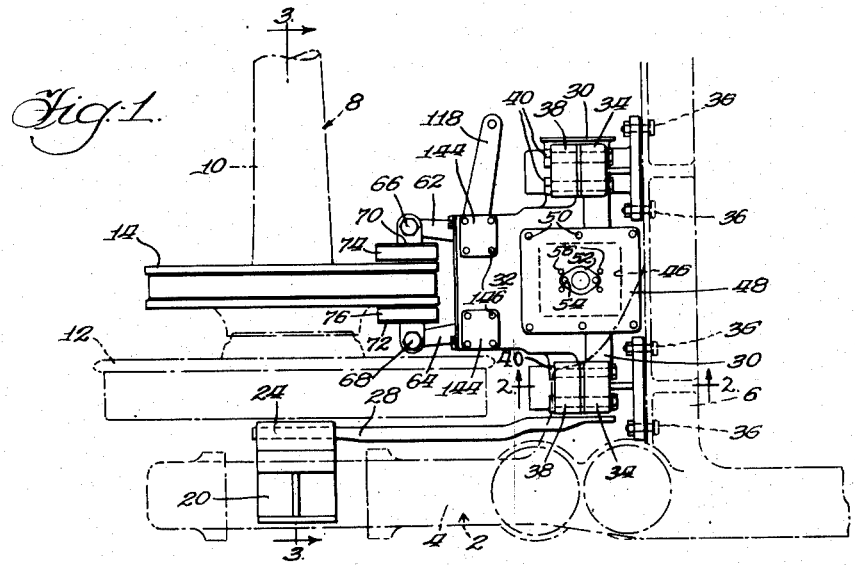
Figure 2:
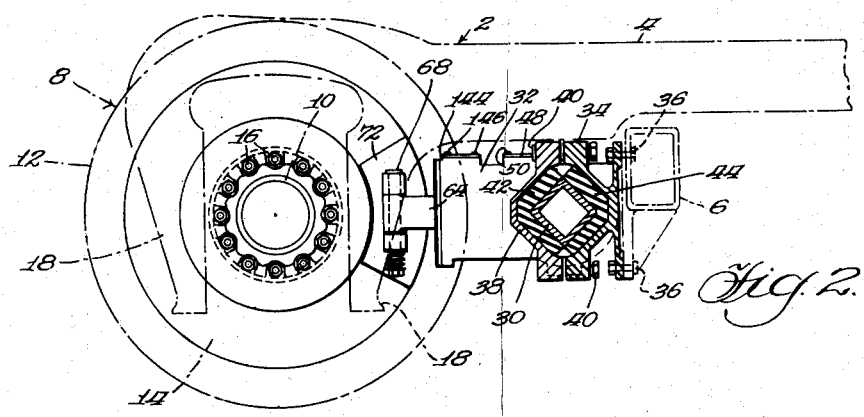
Figure 2 is a side elevational view, with the brake support and a portion of the truck frame in section on the line 2—2 of Figure 1.
Figure 3:
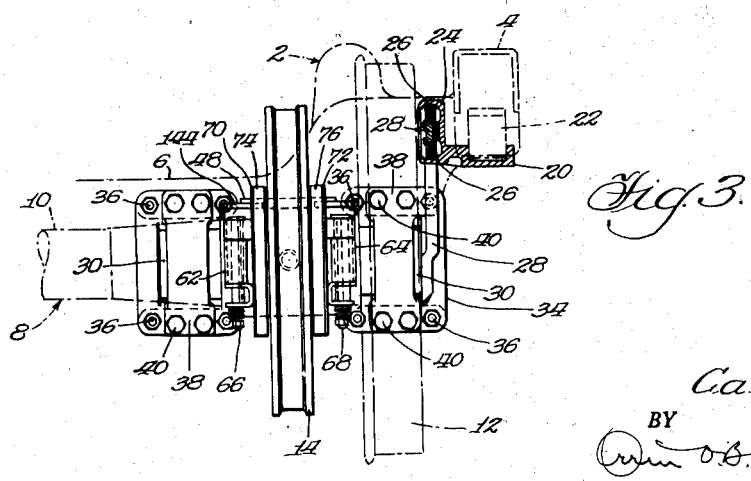
Figure 3 is a sectional view on the line 3—3 of Figure 1.

Describing the invention in detail and referring first to the general assembly views of Figures 1 to 3 inclusive, the novel brake mechanism is illustrated as applied to a truck frame structure generally designated 2 and shown in dot and dash lines in Figures 1 to 3, said structure including a frame having a side rail 4 at each side thereof and a transom 6 interconnecting the side rails 4 adjacent a wheel and axle assembly, generally designated 8 and including an axle 10, a wheel 12, and a brake disc 14 secured for rotation thereto as by screws or studs 16, Figure 2.

At each end thereof, the side rail 4 is provided with a pair of depending pedestals or legs 18 adapted to embrace an associated journal box (not shown) which affords support for an equalizer seat 20 supporting an end of a conventional equalizer 22 fragmentarily shown in Figure 3, said equalizer being adapted to afford spring support in the conventional manner for the frame 2, as will be readily understood by those skilled in the art.

The inboard side of the equalizer seat is provided with a bracket 24 containing top and bottom sets of resilient pads 26 confining a torque arm 28 connected to the outboard end of a hollow lug or extension 30 of a cylinder housing 32, the inboard end of which is provided with a similar lug or extension 30, each of the lugs 30 being secured to the frame transom 6 by a bracket 34 mounted on the transom by bolt and nut assemblies 36 and provided with a clamping plate 38 secured thereto as by bolt and nut assemblies 40.

As best seen in Figures 1 and 2, each lug 30 is generally square in cross section and is preferably arranged with opposed corners thereof at the top and bottom thereof, as best shown in Figure 2. The forward and rear surfaces of the lug 30 are abutted and confined by a forward resilient pad 42 and the rear surfaces of the lug 30 are confined by a rear resilient pad 44, the pad 42 being clamped against the lug 30 by the clamp plate 38, and the pad 44 being clamped between the lug 30 and the bracket 34 by the plate 38 as clearly shown in Figure 2. The top of the cylinder housing 32 is provided with an opening 46 normally closed by a cover plate 48 secured to the housing as by screws 50. The cover plate is provided with a nozzle 52 secured thereto as by screws 54 and adapted to afford a convenient fitting for connection to an associated supply of fluid pressure such as a compressed air line (not shown). The plate 48 is also secured by screws 56, Figure 1 to a cylinder unit 58 (Figure 4) having openings 60 complementary to and receiving the screws 56.

Referring again to Figure 1, the housing contains a pair of brake shoe actuating levers 62 and 64 pivoted by pins 66 and 68 to inboard and outboard brake heads 70 and 72 carrying brake shoes 74 and 76 adapted upon actuation of the lever 62 and 64 to frictionally engage opposite sides of the brake disc 14.

Figure 6:
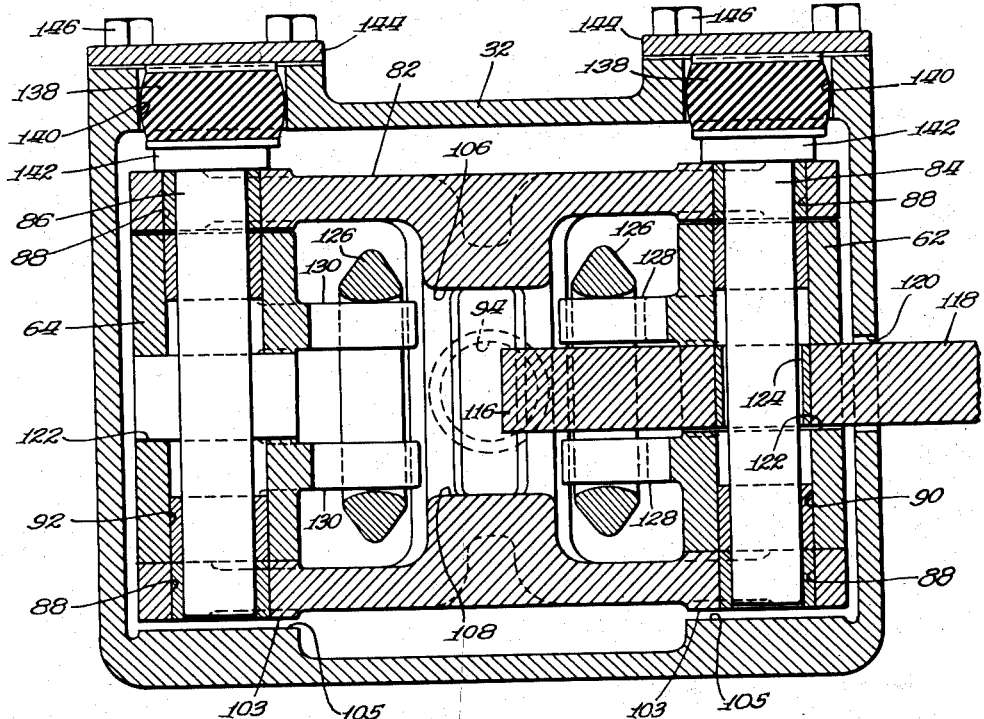
Figure 6 is a sectional view on the line 6—6 of Figure 4.
Figure 5:
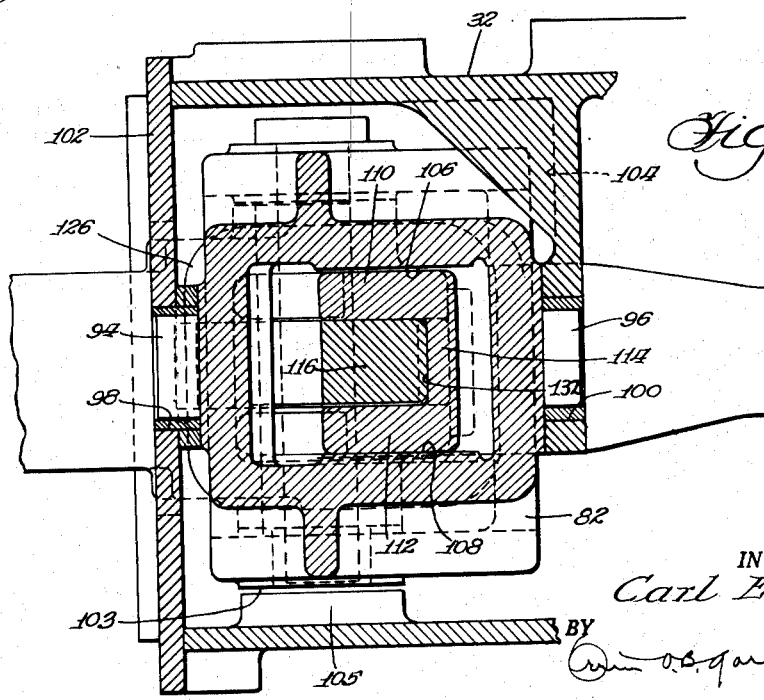
Figure 5 is a fragmentary sectional view on the line 5—5 of Figure 4.

Referring now to Figures 4 to 6 inclusive, it will be seen that the cylinder 58 contains spaced pistons 78 engageable with the inner ends of the levers 62 and 64 and comprises an air port 80 adapted to conduct actuating fluid from the nozzle 52 to the cylinder 58 between the pistons 78, as best seen in Figure 4 thereby actuating the levers 62 and 64 under normal conditions.

The brake levers 62 and 64 extend into a hollow fulcrum casting 82 and are fulcrumed thereto by pivot pins 84 and 86 respectively, extending through bushed openings 88 in the fulcrum casting 82, and through bushed openings 90 and 92 in the levers 62 and 64 respectively.

The front and rear extremities of the casting 82 are provided with substantially co-axial trunnions 94 and 96 respectively, as best seen in Figures 4 and 5, said trunnions extending through bushed openings 98 and 100 in spaced walls 102 and 104 of the cylinder housing 32, thereby accommodating pivotal movement of the fulcrum casting 82 during angling of the wheel and axle assembly 8, with respect to the truck frame 2, as will be understood by those skilled in the art. Such pivotal movement of the fulcrum member 82 is positively limited by abutment of downwardly facing bosses 103 thereof with aligned bosses 105 of the cylinder housing 32 as best seen in Figures 5 and 6.

The top and bottom walls of the fulcrum casting 82 are inwardly offset as at 106 and 108 respectively (Figures 5 and 6) to define a chamber receiving the top and bottom walls 110 and 112 of an equalizer member or lever 114 engaged by a nose 116 of a hand brake operating lever 118 extending through a complementary slot 120 of the housing 32, and through a slot 122 of the lever 62, said lever 118 having a bushed opening 124 receiving the pin 84 which thus affords pivotal fulcrum for the lever 118 as well as the lever 62. The pin 84 is loosely fitted in the opening 124 to accommodate tilting of the fulcrum 82 on the trunnions 94 and 96. It may be noted that the lever 64 is provided with a similar slot 122 so that the levers 62 and 64 are interchangeable.

The equalizer 114 is connected by an inboard loop or link 126 to a pair of top and bottom actuator arms or lugs 128 on the lever 62 and by an outboard loop 126 to a pair of similar actuator arms or lugs 130 on the lever 64, and as best seen in Figure 6, the hand brake operating lever 118 extends between the lugs 128 of the lever 62, the nose 116 of the lever 118 being engaged as at 132 (Figures 4 and 5) with the equalizer 114.

Thus, upon actuation of the lever 118, the latter rotates counterclockwise about the pin 84 as seen in Figure 4, and the nose 116 of the lever 118 moves the equalizer 114 to the right within the fulcrum casting 82 along the guide surfaces 106 and 108 thereof, thereby pulling the links 126 and the arms 128 and 130 of the levers 62 and 64 to engage the brake shoes 74 and 76 with the disc 14. It may be noted that upon release of the levers 62 and 64, a pair of springs 134 housed within the lugs 30 and guidably mounted within cylindrical spring containers 135 welded therewithin as at 136, are operable to restore the levers 62 and 64 to their released position shown in the drawings.

Pivotal or tilting movement of the fulcrum casting 82 on its trunnions 94 and 96 during engagement of the shoes 74 and 76 with the brake disc 14 as the wheel and axle assembly angles vertically with respect to the truck frame 2, is limited as above-described by bosses 103 and 105 and is yieldingly resisted by resilient pads 138 mounted within openings 140 of the cylinder housing 32 and compressed against heads 142 of the pins 84 and 86 by spring caps 144 secured to the housing 32 over the openings 140 as by screws 146.

It may be noted that the nose 116 of the lever 118, as best seen in Figure 5, is guidably received between the walls 110 and 112 of the equalizer 114 which is in turn guidably received between the top and bottom surfaces 106 and 108 of the fulcrum casting 82, and the loops 126 are snugly fitted over the equalizer 110 and the actuator lugs 128 and 130 of the levers 62 and 64, thereby providing an arrangement in which the hand brake parts are guidably interengaged with each other to prevent excessive vibratory movements between the parts while accommodating movement thereof during actuation of the brake levers 62 and 64 to applied and released positions thereof and during pivoting of fulcrum member 82 on its trunnions 94 and 96. Furthermore, in the released position of the levers 62 and 64, the springs 134 are operable to maintain the links 126 in tight engagement with the actuator arms 128 and 130 and with the equalizer 114, thereby limiting vibration between the above-described hand brake linkage.

I claim:

1. In a brake arrangement for a railway car truck having a wheel and axle assembly including rotatable brake surfaces; the combination of a brake support structure mounted on the truck and including a cylinder housing, a cylinder and piston device in said housing, a pair of levers pivotally fulcrumed to said structure and having their inner ends projecting into the housing and operatively associated with said device, friction means carried by the levers for braking engagement with said surfaces, said levers having pairs of arms respectively on their adjacent sides, an equalizer between the levers, an operating lever projecting between the arms of one pair and engaged with the equalizer, loops surrounding respective pairs of arms and the equalizer, one of the loops surrounding a portion of the operating lever, and independent springs within the housing associated with the inner ends of respective levers for yieldingly urging the same to release position.

2. A brake arrangement according to claim 1, wherein the equalizer is provided with top and bottom webs embracing the operating lever, the top web being supported by the operating lever.

3. In a brake arrangement for a railway car truck having a wheel and axle assembly including a rotor; the combination of a brake support structure carried by the truck, a brake lever fulcrum pivotally mounted on a substantially horizontal axis to said structure, a pair of brake levers pivotally fulcrumed on substantially vertical axes to said fulcrum, arms formed on said levers, a power device housed in said structure and operatively connected to said levers, and hand brake means housed within the fulcrum and operatively associated with said levers for actuation thereof independently of said device, said hand brake means including an equalizer snugly and slidably confined between substantially horizontal top and bottom surfaces of the fulcrum, and an operating lever disposed between top and bottom surfaces of the equalizer and affording a slidable seat for said top surface thereof, and links connecting the equalizer to the arms of the brake levers.

4. In a brake arrangement for a railway car truck comprising a wheel and axle assembly including rotatable brake surfaces; the combination of a brake support structure including a cylinder housing and elongated hollow extensions at the inboard and outboard ends thereof, means for connecting the structure to the truck comprising removable means connected between the extensions and the truck, a pair of brake levers pivotally fulcrumed to said structure and carrying brake shoes for braking engagement with rotatable surfaces of said assembly, arms formed on said levers, a hand brake operating means for actuating said levers, and release means for said levers comprising springs housed in said extensions and operatively associated with the lever for actuating the same to released position, the hand brake operating means comprising an equalizer between the levers, an operating lever having a portion engaged with the equalizer, and loops surrounding the equalizer adjacent respective ends thereof, said loops being engaged with the arms of respective levers.

5. In a brake arrangement for a railway car truck having a wheel and axle assembly including rotatable brake surfaces; the combination of a brake support structure carried by the truck and including a cylinder housing, a piston and cylinder device within the housing, a pair of brake levers having corresponding ends thereof extending into the housing for operative association with said device, pivotal means for fulcruming the respective levers to said structure, said levers having operating arms fixed thereto and disposed outwardly of said pivotal means, and hand brake operating means operatively connected to said arms for urging the same toward said device, the outer ends of said levers having friction means engageable with said surfaces, the hand brake operating means comprising an equalizer between the levers, an operating lever having a portion engaged with the equalizer, and loops surrounding the equalizer adjacent respective ends thereof, said loops being engaged with the arms of respective levers.

6. In a brake arrangement for a railway car truck having a wheel and axle assembly including rotatable brake surfaces; the combination of a brake support structure carried by the truck and including a cylinder housing, a piston and cylinder device within the housing, a pair of brake levers having corresponding ends thereof extending into the housing for operative association with said device, pivotal means for fulcruming the respective levers to said structure, said levers having operating arms fixed thereto and disposed outwardly of said pivotal means, and hand brake operating means operatively connected to said arms for urging the same toward said device, the outer ends of said levers having friction means engageable with said surfaces, the hand brake operating means comprising an equalizer having a top wall, an operating lever overlying the top wall and slidably supporting the same, and loop members connecting the equalizer to the arms of the respective levers.

7. In a brake arrangement for a railway car truck having a wheel and axle assembly including rotatable brake surfaces; the combination of a brake support structure supported by the truck, a pair of levers pivotally fulcrumed to said structure, friction means carried by said levers for engaging said surfaces, a pair of spaced arms on each lever, an equalizer between said levers, an operating lever extending between the arms of one pair and engaged with the equalizer, and a pair of loop-shaped links each surrounding one pair of arms and the equalizer, one of the links surrounding a portion of the operating lever.

8. In a brake arrangement for a railway car truck having a wheel and axle assembly including rotatable brake surfaces; the combination of a brake support structure carried by the truck, a pair of brake levers, pivot pins fulcruming the levers to the structure, a power cylinder device operatively connected to corresponding ends of the levers, brake shoes carried by opposite corresponding ends of the levers for engaging respective surfaces, hand brake arms rigidly fixed on respective levers and disposed between the surfaces and a vertical plane bisecting the pins, and hand brake operating means comprising equalizer structure disposed between said levers and links connecting opposite ends of said structure to the related arms.

9. In a brake arrangement for a railway car truck having a wheel and axle assembly including a brake rotor; the combination of a brake support carried by the truck adjacent the rotor, a pair of brake levers, pivot pins fulcruming the brake levers to the structure, said levers having relatively short segments projecting from the pins to opposite sides of the rotor and said lever having relatively long segments projecting from the pins in the direction away from the rotor, arms formed on said short segments, a fluid pressure device connected to the long segments for actuation thereof, and hand brake means comprising equalizer structure disposed between said levers and links connecting opposite ends of the structure to the related arms.

10. In a brake arrangement for a railway car truck having a wheel and axle assembly including a brake rotor, the combination of a brake support carried by the truck adjacent the rotor, a pair of brake levers, pivot pins fulcruming the brake levers to the structure, said levers having relatively short segments projecting from the pins to opposite sides of the rotor and said lever having relatively long segments projecting from the pins in the direction away from the rotor, a fluid pressure device connected to the long segments for actuation thereof, and hand brake means having a connection to the short segments for actuation thereof, said connection being independent of the long segments, the hand brake means being disposed between said levers and comprising arms on the adjacent sides of the short lever segments, and an equalizer between the short lever segments, loops surrounding the equalizer and the arms, and an operating lever engaging the equalizer at a point between the loops.

11. In a brake arrangement for a railway car truck having a wheel and axle assembly including a brake rotor, the combination of a brake support carried by the truck adjacent the rotor, a pair of brake levers, pivot pins fulcruming the brake levers to the structure, said levers having relatively short segments projecting from the pins to opposite sides of the rotor and said lever having relatively long segments projecting from the pins in the direction away from the rotor, a fluid pressure device connected to the long segments for actuation thereof, and hand brake means having a connection to the short segments for actuation thereof, said connection being independent of the long segments, the hand brake means being disposed between said levers and comprising arms on the adjacent sides of the short lever segments, and an equalizer between the short lever segments, loops surrounding the equalizer and the arms, and an operating lever engaging the equalizer at a point between the loops, the equalizer comprising a top web overlying the operating lever and supported thereby, whereby the loops and the equalizer are supported by the operating lever and said arms.

12. In a brake arrangement for a railway car truck having a wheel and axle assembly including rotatable brake surfaces; the combination of a support structure carried by the truck, a pair of levers pivotally fulcrumed to the structure and having segments extending at opposite sides of said surfaces and other segments extending away from said surfaces, arms on said first mentioned segments, power means for operating said other segments, and hand brake means comprising equalizer structure disposed between said levers and links connecting opposite ends of the structure to the related arms.

CARL E. TACK.

References Cited in the file of this patent

UNITED STATES PATENTS

| Number | Name | Date |
|---|---|---|
| 2,355,122 | Tack | Aug. 8, 1944 |
| 2,436,136 | Baselt | Feb. 17, 1948 |
| 2,438,481 | Tack | Mar. 23, 1948 |